(12) United States Patent
Suyama et al.

(10) Patent No.: US 7,057,493 B2
(45) Date of Patent: Jun. 6, 2006

(54) LIGHTING SYSTEM

(75) Inventors: Terumasa Suyama, Aichi (JP);
Takashi Ichikawa, Aichi (JP);
Toshimasa Shibagaki, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 165 days.

(21) Appl. No.: 10/648,467

(22) Filed: Aug. 26, 2003

(65) Prior Publication Data

US 2004/0113754 A1 Jun. 17, 2004

(30) Foreign Application Priority Data

Aug. 29, 2002 (JP) ............................. 2002-251805

(51) Int. Cl.
G06K 19/00 (2006.01)
B60R 25/00 (2006.01)

(52) U.S. Cl. ..................... 340/5.61; 340/5.1; 340/5.72

(58) Field of Classification Search ............... 340/5.61, 340/5.64, 5.2, 5.7, 5.8, 5.81, 5.1
See application file for complete search history.

(56) References Cited

U.S. PATENT DOCUMENTS 5,280,417 A * 1/1994 Hall et al. .................. 362/226
5,491,471 A 2/1996 Stobbe
5,535,104 A * 7/1996 Maffey et al. ............... 362/100
5,541,585 A * 7/1996 Duhame et al. ........... 340/5.62
5,790,034 A * 8/1998 Khoury ..................... 340/5.64
5,844,495 A * 12/1998 Griessbach ................ 340/5.64
5,969,637 A 10/1999 Doppelt et al.
6,023,224 A 2/2000 Meyvis
2003/0112122 A1* 6/2003 Hu ............................. 340/5.64
2003/0210167 A1 11/2003 Weng

FOREIGN PATENT DOCUMENTS

| DE | 39 40 936 A1 | 6/1991 |
|---|---|---|
| DE | 100 64 141 A1 | 7/2002 |
| DE | 202 08 061 U1 | 9/2002 |

* cited by examiner

Primary Examiner—Michael Horabik
Assistant Examiner—Clara Yang
(74) Attorney, Agent, or Firm—Crompton, Seager & Tufte, LLC

(57) ABSTRACT

A lighting system that automatically turns on lights with a key used for locking the doors of a car and a house. The system includes the key and a lighting device. The key generates and transmits a transmission signal containing verification subject information. A light control unit connected to the lighting device receives the transmission signal from the key and verifies the key with an ID code. The light control unit activates the lighting device.

6 Claims, 3 Drawing Sheets

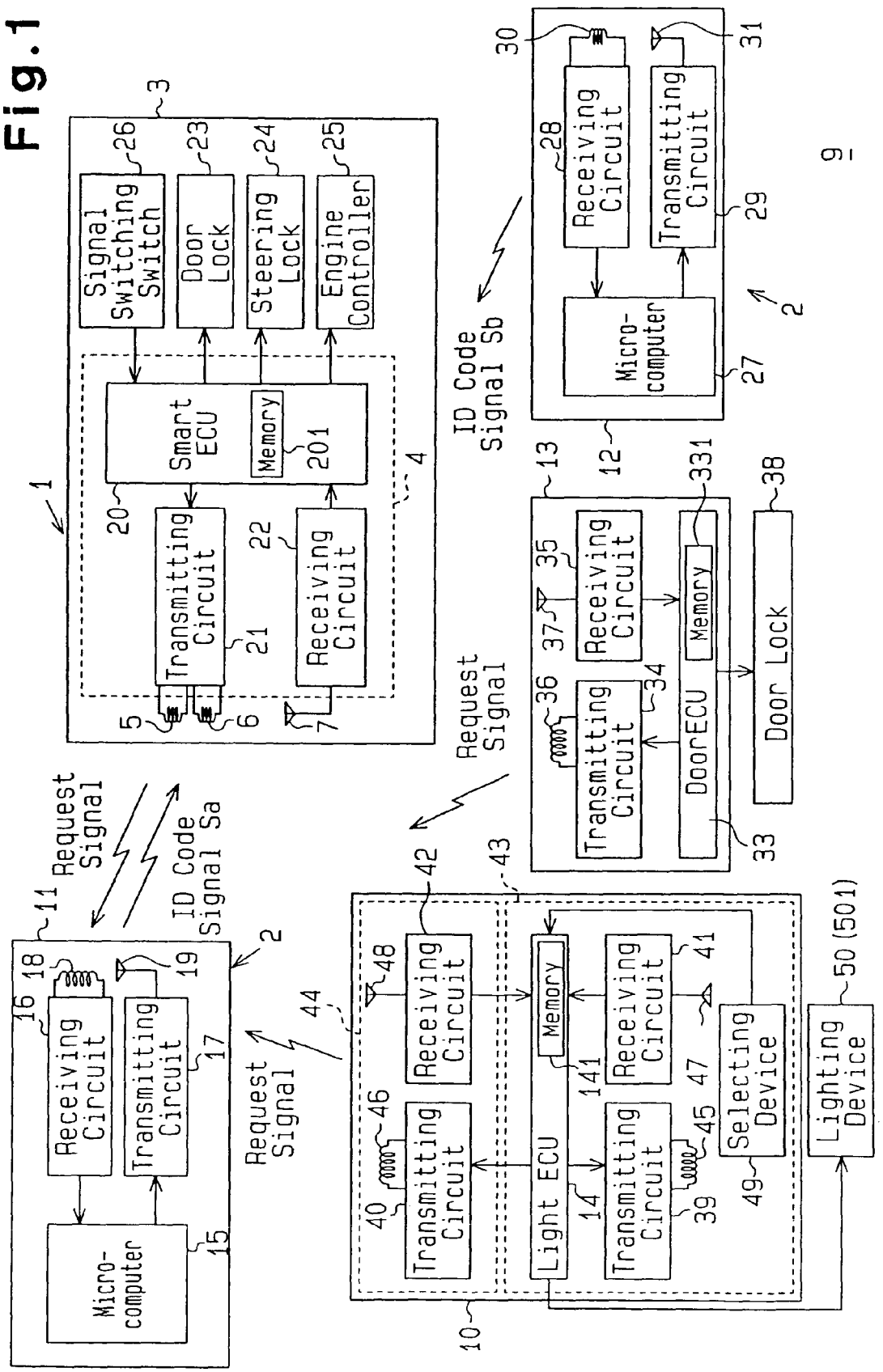

LIGHTING SYSTEM

BACKGROUND OF THE INVENTION

The present invention relates to a lighting system.

The door of a house or a car normally has a lock with a keyhole. A mechanical key is inserted in the keyhole and turned to lock and unlock the door.

However, it is difficult to confirm the keyhole in the dark, such as during the nighttime, when locking and unlocking the door with the mechanical key.

For example, when a person parks a car in the parking of a house during the dark, a lamp may be lit to light the parking so that the person may confirm the keyhole. In such a case, someone must operate a switch to turn on the light. When a person locks or unlocks a house door, the door may be lit to confirm the keyhole. This would also require someone to operate a switch that lights the door. Further, it would be safe for a person moving between the parking and the house entrance if the area between the parking and the house entrance is lit. However, it may be difficult for a person to find a switch that lights this area. One may also forget to turn off the switch.

SUMMARY OF THE INVENTION

One aspect of the present invention is a lighting system including a lighting device and a portable device, which includes a signal output unit. The signal output unit generates and transmits a transmission signal containing verification subject information. A light control unit is connected to the lighting device. The light control unit receives the transmission signal from the portable device and verifies the verification subject information with verification reference information. The light control unit controls activation and deactivation of the lighting device.

A further aspect of the present invention is a lighting system including a lighting device and an electronic key, which includes a signal output unit. The signal output unit generates and transmits a transmission signal containing verification subject information. A light control unit is connected to the lighting device. The light control unit receives the transmission signal from the electronic key through wireless communication and verifies the verification subject information with verification reference information. The light control unit controls activation and deactivation of the lighting device. A lock control unit receives the transmission signal through wireless communication and verifies the verification subject information with the verification reference information to control locking and unlocking of a door in accordance with the verification.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a schematic block diagram of a lighting system and an electronic key system according to a first embodiment of the present invention;

DETAILED DESCRIPTION OF THE PREFERRED EMBODIMENTS

Figure 2A:
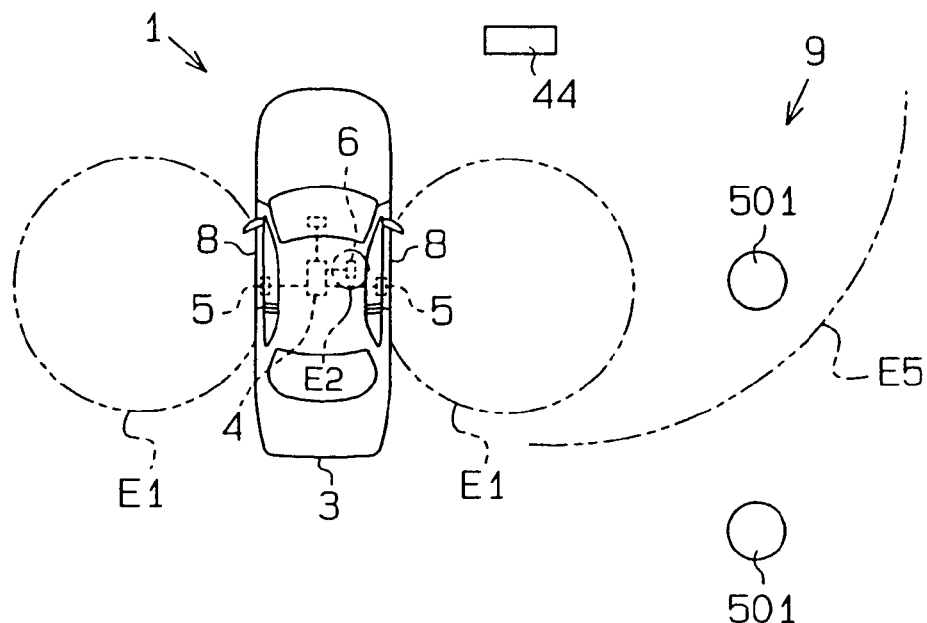
FIG. 2(a) is a schematic diagram of the lighting system and the electronic key system of FIG. 1.

In the drawings, like numerals are used for like elements throughout.

FIG. 2(a) is a schematic diagram showing the entire structure of a electronic key system 1 and a lighting system 9. Predetermined key operations are performed by the electronic key system 1 by means of wireless communication. The electronic key system 1 includes a controller (second lock control unit) 4, which is installed in a vehicle 3, and a lock control unit (first lock control unit) 13, which controls locking and unlocking of a house door 32. Wireless communication is enabled between the electronic key 2 and the controller 4 and between the electronic key 2 and the lock control unit 13.

The controller 4 exchanges various signals (radio waves) with the electronic key 2 via antennas 5 to 7, which are arranged in the vehicle 3. The antennas 5 are arranged on left and right doors 8 of the vehicle 3. The antenna 6 is located near the driver's seat. The antenna 7 (shown in FIG. 1) is used to receive signals. The antennas 5 each have an area E1 in which communication with the electronic key 2 is enabled. The antenna 6 has an area E2 in which communication with the electronic key 2 is enabled. Signal lines (communication cables) connect the antennas 5 to 7 to the controller 4.

Figure 2B:
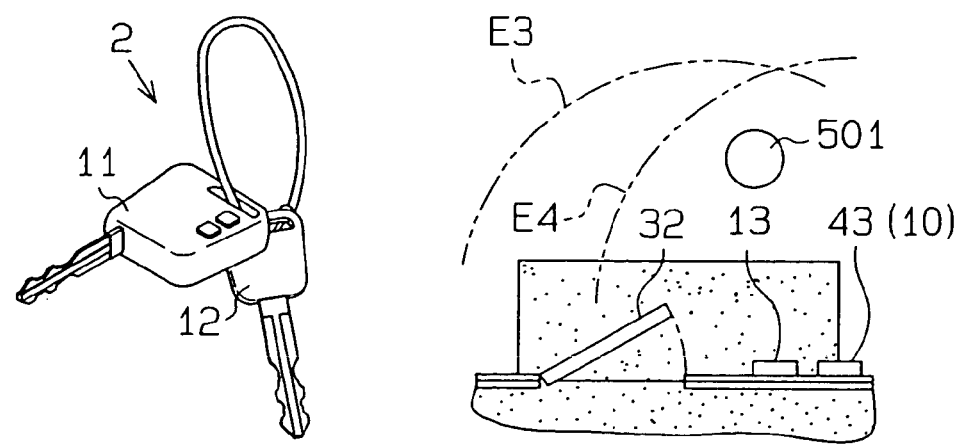
FIG. 2(b) is a perspective view showing an electronic key.

FIG. 2(b) is a perspective view showing the electronic key 2. A master key 11 or a sub-key 12 may be used as the electronic key 2. The owner (driver) of the vehicle 3 always holds the master key 11.

FIG. 1 is a schematic diagram of the electronic key system 1 and the lighting system 9. FIG. 1 shows the electronic key system 1. The electronic key system 1 is a so-called smart key system provided with a keyless entry function. The smart key system automatically unlocks the vehicle door 8 when the driver, who is holding the master key 11, approaches the door 8 and automatically locks the door 8 when the driver moves away from the door 8. Further, the smart key system automatically unlocks the house door when the driver, who is holding the master key 11, approaches the house door 32 and automatically locks the door 32 when the driver moves away from the door 32.

The smart key system also has an ignition function for starting the engine when the owner (driver) of the vehicle 3 operates an ignition knob (not shown).

The smart key system will now be described. The master key 11 includes a microcomputer 15, a receiving circuit 16, and a transmitting circuit 17. The receiving circuit 16 receives a request signal (radio wave) transmitted from the vehicle 3 via an antenna 18 and provides the request signal to the microcomputer 15. In response to the request signal, the microcomputer 15 generates an ID code signal in accordance with an ID code of the master key 11. The transmitting circuit 17 transmits a radio wave (ID code signal) Sa, which is generated by frequency-modulating the ID code signal, from the master key 11 via an antenna 19.

The controller 4 includes a smart ECU 20, a transmitting circuit 21, and a receiving circuit 22. The transmitting circuit 21 converts a request signal output from the smart ECU 20 to a radio wave having a predetermined frequency and transmits the converted request signal from the controller 4 via the antennas 5 or 6. The receiving circuit 22 receives an ID code signal via the antenna 7, modulates the ID code signal to a pulse signal, and provides the pulse signal to the smart ECU 20.

The smart ECU 20 includes a CPU (not shown) and a memory 201. An ID code of the master key 11 and an ID code of the sub-key 12 are stored in the memory 201. In response to the ID code signal received by the antenna 7, the smart ECU 20 verifies the ID code of the ID code signal with the ID code in the memory 201. In accordance with the code verification result, the smart ECU 20 operates a door lock drive device 23, a steering lock drive device 24, and an engine controller 25, which are provided in the vehicle 3.

A signal switching switch 26 is arranged in the vehicle and connected to the smart ECU 20. The signal switching switch 26 provides the smart ECU 20 with an OFF signal before the driver enters the vehicle 3. Further, the signal switching switch 26 provides the smart ECU 20 with an ON signal after the driver opens the door 8, enters the vehicle 3, and closes the door 8. In response to the OFF signal from the signal switching switch 26, the smart ECU 20 transmits a request signal from the antennas 5. Further, in response to the ON signal from the signal switching switch 26, the smart ECU 20 transmits the request signal from the antenna 6.

The lock control unit 13 includes a door ECU 33, a transmitting circuit 34, and a receiving circuit 35. The door ECU 33 provides the transmitting circuit 34 with a request signal. The transmitting circuit 34 converts the request signal to a radio wave having a predetermined frequency and transmits the converted request signal from an antenna 36. The receiving circuit 35 receives an ID code signal from outside the lock control unit 13, converts the ID code signal to a pulse signal, and provides the pulse signal to the door ECU 33.

The door ECU 33 includes a CPU (not shown) and a memory 331. The memory 331 stores an ID code of the master key 11 and an ID code of the sub-key 12. The door ECU 33 verifies the ID code signal received via an antenna 37 with the stored ID code. In accordance with the code verification, the door ECU 33 operates a door lock drive device 38 of the door 32.

The operation of the smart key system will now be discussed. When the door 8 of the vehicle 3 is locked, the signal switching switch 26 provides the smart ECU 20 with the OFF signal. In accordance with the OFF signal, the smart ECU 20 intermittently transmits the request signal from the antennas 5. When the driver who is holding the master key 11 enters any of the areas E1 (refer to FIG. 2(a)) and the antenna 18 of the master key 11 receives the request signal, the master key 11 transmits the ID code signal Sa from the antenna 19. In other words, the master key 11 is normally in a standby mode and automatically returns the ID code Sa to the controller 4 in response to the request signal.

The smart ECU 20 verifies the ID code of the received ID code signal Sa with the ID code in the memory 201. When the received ID code matches the ID code of the memory 201 and the OFF signal is received from the signal switching switch 26, the smart ECU 20 operates the door lock drive device 23 and unlocks the door. If the received ID code does not match the ID code of the memory 201, the smart ECU keeps the door locked. In this manner, the smart entry function automatically unlocks the door.

Then, when the driver sits on the driver's seat and closes the door 8, the signal switching switch 26 provides the smart ECU 20 with the ON signal. In accordance with the ON signal, the smart ECU 20 intermittently transmits the request signal from the antenna 6. When the master key 11 receives the request signal in the area E2 (refer to FIG. 2(a)), the master key 11 transmits the ID code signal Sa from the antenna 19. The smart ECU 20 verifies the ID code of the ID code signal Sa with the ID code stored in the memory 201.

If the received ID code matches the ID code of the memory 201 when the ON signal is received from the signal switching switch 26, the smart ECU 20 enables the starting of the engine. More specifically, the smart ECU 20 unlocks the steering wheel (not shown) with the steering lock drive device 24 and provides the engine controller 25 with an engine start enable signal. When the ignition knob is operated after the engine start enable signal is received, the engine controller 25 performs fuel injection and engine ignition to start the engine.

If the two ID codes do not match, the smart ECU 20 does not enable the starting of the engine even if the signal switching switch 26 is providing the ON signal. In other words, the smart ECU 20 does not provide the engine controller 25 with the engine start enable signal, and the engine controller 25 thus does not perform fuel injection (or engine ignition) to start the engine even if the ignition knob is operated. Accordingly, a third person who is not holding the master key 11 cannot start the engine since the ignition function is not activated unless the ID code of the master key 11 matches the ID code of the smart ECU 20.

When the house door 32 is locked, the door ECU 33 intermittently transmits the request signal from the antenna 36. When the driver, who is holding the master key 11, enters area E3 (refer to FIG. 2(a)), the master key 11 receives the request signal and transmits the ID code signal Sa from the antenna 19 in response to the request signal.

The door ECU 33 receives the ID code signal Sa and verifies the ID code of the master key 11 with the ID code stored in the memory 331. If the received ID code matches the ID code of the memory 331, the door ECU 33 unlocks the door 32 with the door lock drive device 38. If the two ID codes do not match, the door ECU 33 does not unlock the door 32.

The sub-key 12 includes a microcomputer 27, a receiving circuit 28, and a transmitting circuit 29. The receiving circuit 28 receives the request signal (radio wave) transmitted from the controller 4 of the vehicle 3 or from the door ECU 33 of the house via an antenna 30. The receiving circuit 28 provides the request signal to the microcomputer 27. In response to the request signal, the microcomputer 27 generates an ID code of the sub-key 12. The transmitting circuit 29 transmits an ID code signal (radio wave) Sb having a predetermined frequency via an antenna 31. Thus, the sub-key 12 functions in the same manner as the master key 11 in the smart key system.

The lighting system 9 will now be discussed. The lighting system 9 includes the electronic key 2, which is a portable device, the controller 4, and a light control unit 10. The light control unit 10 includes a light ECU 14, transmitting circuits 39 and 40, receiving circuits 41 and 42, and a selecting device 49.

The selecting device 49 is connected to the light ECU 14. Further, the selecting device 49 detects the luminance of the surrounding environment, generates an enablement mode signal only when the luminance of the surrounding environment is less than or equal to a predetermined value, and provides the light ECU 14 with the enablement mode signal. The light control unit 10 includes an enablement mode, which enables activation of a lighting device 50 when the luminance of the surrounding environment is less than or equal to the predetermined value, and a disablement mode, which disables the lighting of the lighting device 50 when the luminance of the surrounding environment exceeds the predetermined value. The selecting device 49 selects the enablement mode or the disablement mode.

A main controller 43, which includes the transmitting circuit 39, the receiving circuit 41, and the selecting device 49, is located near the door 32, as shown in FIG. 2(*a*). A transmitting-receiving device 44, which includes the transmitting circuit 40 and the receiving circuit 42, is located near the parking for the vehicle 3. A signal line connects the main controller 43 and the transmitting-receiving device 44. The light ECU 14 controls the lighting device 50. The lighting device 50 includes a plurality of lamps 501 that lights the area between the parking of the vehicle 3 and the house door 32.

The transmitting circuits 39 and 40 of the light control unit 10 converts a request signal, which is received from the light ECU 14, to a radio wave and transmits the radio wave from antennas 45 and 46. The receiving circuits 41 and 42 receives an ID code signal via antennas 47 and 48, converts the received ID code signal to a pulse signal, and provides the pulse signal to the light ECU 14.

The light ECU 14 includes a CPU (not shown) and a memory 141. The memory 141 stores the ID code of the master key 11 and the ID code of the sub-key 12. The light ECU 14 verifies the ID code input via the antennas 47 and 48 with the stored ID code. In accordance with the code verification, the light ECU 14 controls the lighting of the lighting device 50.

The lighting system 9 operates as described below. An example in which the lamps 501 are in a state in which they are not lit will first be described. In this case, when the selecting device 49 is providing the light ECU 14 with the enablement mode signal, the light control unit 10 is in the enablement mode. Further, the light ECU 14 intermittently transmits the request signal from the antennas 45 and 46. When a person holding the master key 11 enters area E4 or area E5 (refer to FIG. 2(*a*)), the master key 11 receives the request signal via the antenna 18 and transmits the ID code signal Sa from the antenna 19 in response to the request signal. The master key 11 is normally in the standby mode and automatically returns the ID code signal Sa (transmission signal) only in response to the request signal.

The light ECU 14 receives the ID code signal Sa via the antenna 47 and the receiving circuit 41 or via the antenna 48 and the receiving circuit 42. The light ECU 14 verifies the received ID code (i.e., verification subject information) with the ID code stored in the memory 141 (i.e., ID code of the master key 11 serving as verification reference information). When the received ID code matches the ID code in the memory 141, the light ECU 14 activates the lighting device 50 to light the lamps 501.

The time during which the lamps 501 are continuously lit is longer than the transmission time interval of the request signal. Thus, the lighting device 50 keeps the lamps 501 lit during the continuous lighting time. The continuous lighting time is set, for example, in accordance with the time required for the driver to reach the house door 32 from the parking when walking slowly. Therefore, the transmission of the request signal from the ECU 14, the receiving of the request signal by the master key 11, and the verification of the ID code are repeated to continuously light the lamps 501.

When the person holding the master key 11 moves out of the areas E4 and E5, the light ECU 14 deactivates the lighting device 50 to stop the lighting. The lighting device 50 turns off the lamps 501 after the continuous lighting time elapses.

If the two codes do not match, the light ECU 14 does not light the lamps 501.

When a person holding the sub-key 12 enters the area E4 or E5, the sub-key 12 receives the request signal via the antenna 30 and transmits the ID code signal Sb from the antenna 31 in response to the request signal. The sub-key 12 is normally in the standby mode and automatically returns the ID code signal Sb (transmission signal) only in response to the request signal.

The light ECU 14 receives the ID code signal Sb via the antenna 47 and the receiving circuit 41 or via the antenna 48 and the receiving circuit 42. The light ECU 14 verifies the received ID code (i.e., verification subject information) with the ID code stored in the memory 141 (i.e., verification reference information). When the received ID code matches the ID code of the memory 141, the light ECU 14 activates the lighting device 50 to light the lamps 501. In other words, the sub-key 12 operates the lighting system 9 in the same manner as the master key 11.

The microcomputer 15, the receiving circuit 16, the transmitting circuit 17, and the antennas 18 and 19 of the master key 11 function as a signal output unit for outputting the verification subject information as the transmission signal. In the same manner, the microcomputer 27, the receiving circuit 28, the transmitting circuit 29, and the antennas 30 and 31 also function as a signal output unit. Accordingly, the master key 11 and the sub-key 12 are portable devices including signal output unit.

The lighting system 9 of the first embodiment has the advantages described below.

(1) When the light control unit 10 retrieves the ID code signal output from the master key 11 or the sub-key 12, the light ECU 14 of the light control unit 10 verifies the ID code of the retrieved ID code signal (verification subject information) with the stored ID code (verification reference information). When the retrieved ID code matches the stored ID code and the light control unit 10 is in the enablement mode, the light ECU 14 instructs the lighting device 50 to perform lighting. This eliminates the need for a switch that turns on the lamps 501, and there is thus no need to operate a lighting switch. Further, when the person holding the master key 11 or the sub-key 12 moves out of the area E4 or E5, the lamps 501 automatically go off. Thus, there is no need to worry about forgetting to turn off the lamps 501.

(2) When the enablement mode is selected by the selecting device 49 and the retrieved ID code matches the stored ID code, the light control unit 10 instructs the lighting device 50 to perform lighting. When the selecting device 49 selects the disablement mode, the light control unit 10 does not instruct the lighting device 50 to perform lighting. Accordingly, the lamps 501 are not lit under unnecessary circumstances such as when the surrounding environment is bright.

(3) When leaving the house, a person would most likely carry the master key 11 or the sub-key 12, which locks and unlocks the house door 32. Accordingly, the master key 11 and the sub-key 12, which are carried when leaving the house, are the optimal portable devices for incorporating the signal output unit that outputs the verification subject information as the transmission signal.

(4) In the electronic key system 1, when a person holding the electronic key 2 (master key 11 or sub-key 12) approaches the door 32, the electronic key 2 outputs an ID code in response to a request signal generated by the lock control unit 13. The lock control unit 13 verifies the ID code and unlocks the door 32 if the ID code is verified. The door 32 is locked when the person holding the electronic key 2 moves away from the door 32. When the person holding the electronic key 2 approaches the vehicle 3, the electronic key 2 outputs an ID code in response to a request signal generated by the controller 4 of the vehicle 3. The controller 4 verifies the ID code and unlocks the door 8 if the ID code is verified. The door 8 is locked when the person holding the electronic key 2 moves away from the vehicle 3.

The ID code of the electronic key 2 in the electronic key system 1 is used as the verification reference information and the stored verification reference information. Accordingly, the electronic key 2 of the electronic key system 1 is the optimal portable device for incorporating the signal output unit that outputs the verification subject information as the transmission signal.

Figure 3:
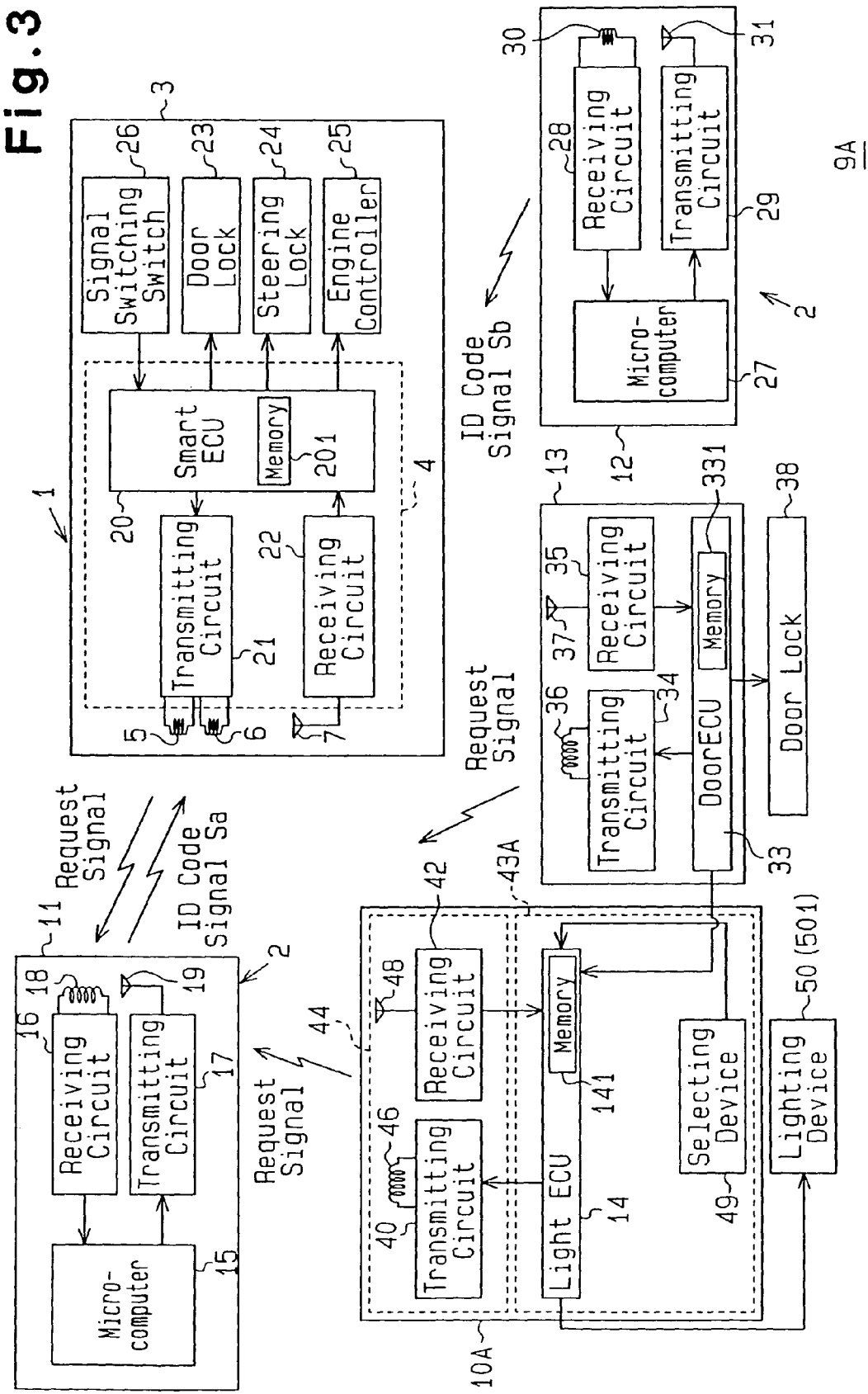
FIG. 3 is a schematic block diagram of a lighting system and an electronic key system according to a second embodiment of the present invention.

A second embodiment of the present invention will now be discussed with reference to FIG. 3.

The lock control unit 13 is located near a light control unit 10A, which serves as a lighting system 9A. The light control unit 10A has a light ECU 14, which is connected to the door ECU 33 of the lock control unit 13.

When a driver, who is holding the master key 11, enters area E3 (refer to FIG. 2(a)), the master key 11 receives a request signal via the antenna 18 and transmits the ID code signal Sa from the antenna 19 in response to the request signal. The door ECU 33 receives the ID code signal Sa via the antenna 37 and the receiving circuit 35 and verifies the received ID code with the ID code stored in the memory 331. When the received ID code matches the ID code of the memory 331, the door ECU 33 activates the door lock drive device 38 to unlock the door 32.

The door ECU 33 transmits the information of the received ID code to the light ECU 14. The light ECU 14 verifies the ID code input from the door ECU 33 with the ID code stored in the memory 141. If the ID code input from the ECU matches the ID code of the memory 141 when the selecting device 49 outputs the enablement mode signal, the light ECU 14 activates the lighting device 50 and turns on the lamps 501.

The sub-key 12 activates the lighting system 9A in the same manner as the master key 11.

The transmitting circuit 34 and the receiving circuit 35 of the lock control unit 13 function as the transmitting circuit 39 and the receiving circuit 41 of the first embodiment. Accordingly, the second embodiment has the same advantages as the first embodiment.

It should be apparent to those skilled in the art that the present invention may be embodied in many other specific forms without departing from the spirit or scope of the invention. Particularly, it should be understood that the present invention may be embodied in the following forms.

In the first embodiment, the verification subject information (ID code) retrieved by the light control unit 10 may be sent to the door ECU 33 of the lock control unit 13 to unlock the door 32 when the verification subject information matches the verification reference information. This enables the elimination of the transmitting circuit 34 and the receiving circuit 35 from the lock control unit 13.

In the above embodiments, when the verification reference information matches the verification subject information, the light control unit 10 and 10A may instruct the lighting device 50 to perform basic lighting. Further, when the verification subject information does not match the verification reference information, the light control unit 10 and 10A may instruct the lighting device 50 to perform a second type of lighting that differs from the basic lighting.

For example, the light color may differ between the basic lighting and the second type of lighting. Alternatively, the basic lighting may be brighter than the second type of lighting.

In the above embodiments, a plurality of the transmitting-receiving devices 44, which are incorporated in the light control unit 10 and 10A, may be arranged in the area between the house and the parking. In such a case, the number of transmitting-receiving devices 44 may be selected in accordance with the distance between the house and the parking so that the lamps 501 are continuously lit as long as the person holding the master key 11 or the sub-key 12 is in the area between the house and the parking. Further, in this case, the lamp 501 closest to the transmitting-receiving device 44 that retrieves the verification subject information may be lit when the verification subject information matches the verification reference information.

In the above embodiments, the portable device may be provided with functions exclusively used for only a lighting system, which includes a signal output unit for outputting the verification subject information as a transmission signal.

The selecting device may generate the enablement mode signal during a predetermined period (nighttime) of a day.

The lamps may be the room lights of the house or the light of the vehicle.

The present examples and embodiments are to be considered as illustrative and not restrictive, and the invention is not to be limited to the details given herein, but may be modified within the scope and equivalence of the appended claims.

What is claimed is:

1. A lighting system comprising:
   a lighting device;
   an electronic key including a signal output unit, wherein the signal output unit generates and transmits a transmission signal containing verification subject information;
   a light control unit connected to the lighting device, wherein the light control unit receives the transmission signal from the electronic key through wireless communication and verifies the verification subject information with verification reference information, the light control unit controlling activation and deactivation of the lighting device; and
   a lock control unit for receiving the transmission signal through wireless communication and verifying the verification subject information with the verification reference information to control locking and unlocking of a house door and a vehicle door in accordance with the verification, the lock control unit including a first lock control unit arranged near the house door to control locking and unlocking of the house door and a second lock control unit arranged in the vehicle to control locking and unlocking of the vehicle door;
   wherein the light control unit includes:
   a main controller located near the house door, the main controller having a first transmitting circuit for transmitting a request signal to the electronic key and a first receiving circuit for receiving the transmission signal from the electronic key; and
   a transmitting-receiving circuit connected to the main controller and located near a parking of the vehicle, the transmitting-receiving circuit having a second transmitting circuit for transmitting a request signal to the electronic key and a second receiving circuit for receiving the transmission signal from the electronic key.

2. The lighting system according to claim 1, wherein the light control unit instructs the lighting device to perform basic lighting when the verification subject information matches the verification reference information and instructs the lighting device to perform lighting that differs from the basic lighting when the verification subject information does not match the verification reference information.

3. The lighting system according to claim 1, wherein the light control unit includes a selecting device for selecting one of an enablement mode, which enables the activation of the lighting device, and a disablement mode, which disables the activation of the lighting device, the light control unit activating the lighting device if the verification subject information matches the verification reference information when the selecting device selects the enablement mode.

4. A lighting system comprising:
   a lighting device;
   an electronic key including a signal output unit, wherein the signal output unit generates and transmits a transmission signal containing verification subject information;
   a light control unit connected to the lighting device, wherein the light control unit receives the transmission signal from the electronic key through wireless communication and verifies the verification subject information with verification reference information, the light control unit controlling activation and deactivation of the lighting device; and
   a lock control unit for receiving the transmission signal through wireless communication and verifying the verification subject information with the verification reference information to control locking and unlocking of a house door and a vehicle door in accordance with the verification, the lock control unit including a first lock control unit arranged near the house door to control locking and unlocking of the house door and a second lock control unit arranged in the vehicle to control locking and unlocking of the vehicle door;
   wherein the light control unit includes a receiving circuit located near a parking of the vehicle to receive the transmission signal from the electronic key, the light control unit being connected to the first lock control unit to receive the verification subject information from the receiving circuit and the first lock control unit.

5. The lighting system according to claim 4, wherein the light control unit instructs the lighting device to perform basic lighting when the verification subject information matches the verification reference information and instructs the lighting device to perform lighting that differs from the basic lighting when the verification subject information does not match the verification reference information.

6. The lighting system according to claim 4, wherein the light control unit includes a selecting device for selecting one of an enablement mode, which enables the activation of the lighting device, and a disablement mode, which disables the activation of the lighting device, the light control unit activating the lighting device if the verification subject information matches the verification reference information when the selecting device selects the enablement mode.

* * * * *